(12) United States Patent
Jehle et al.

(10) Patent No.: US 9,849,872 B2
(45) Date of Patent: Dec. 26, 2017

(54) METHOD FOR CONTROLLING A HYBRID DRIVE OF A VEHICLE AND A COMPUTER PROGRAM FOR CONTROLLING A HYBRID DRIVE OF A VEHICLE

(71) Applicant: Continental Automotive GmbH, Hannover (DE)

(72) Inventors: Martin Jehle, Lappersdorf (DE); Johannes Moritz Maiterth, Aachen (DE); Akos Semsey, Regensburg (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 0 days.

(21) Appl. No.: 15/100,624

(22) PCT Filed: Nov. 24, 2014

(86) PCT No.: PCT/EP2014/075390
§ 371 (c)(1),
(2) Date: May 31, 2016

(87) PCT Pub. No.: WO2015/078808
PCT Pub. Date: Jun. 4, 2015

(65) Prior Publication Data
US 2016/0297422 A1    Oct. 13, 2016

(30) Foreign Application Priority Data
Nov. 28, 2013   (DE) .................. 10 2013 224 349

(51) Int. Cl.
*B60W 50/00*   (2006.01)
*B60L 15/20*   (2006.01)
(Continued)

(52) U.S. Cl.
CPC .......... *B60W 20/13* (2016.01); *B60L 11/1862* (2013.01); *B60L 15/20* (2013.01);
(Continued)

(58) Field of Classification Search
CPC .. B60W 20/13; B60W 20/12; B60W 50/0097; B60W 10/26; B60W 2550/408;
(Continued)

(56) References Cited

U.S. PATENT DOCUMENTS 6,230,496 B1   5/2001  Hofmann et al. .............. 60/706
6,344,732 B2 * 2/2002  Suzuki ..................... B60K 6/48
                                                 180/65.1

(Continued)

FOREIGN PATENT DOCUMENTS

DE   102007045633 A1   4/2009  ............. B60R 16/03
DE   102010016188 A1   11/2010 ............. B60L 11/18

(Continued)

OTHER PUBLICATIONS

German Office Action, Application No. 102013224349.9, 4 pages, dated Oct. 17, 2014.

(Continued)

*Primary Examiner* — Michael J Zanelli
(74) *Attorney, Agent, or Firm* — Slayden Grubert Beard PLLC

(57) ABSTRACT

A method for controlling a hybrid drive of a vehicle includes detecting a traffic and/or street situation ahead of the vehicle, and based on the detected situation, determining an upcoming increase of a performance requirement to be expected from the hybrid drive and increasing a withdrawal rate of an electrical energy source of the hybrid drive. This increase occurs before the performance requirement is realized. The performance requirement may be realized according to the increase of the withdrawal rate, e.g., in conformity with a performance requirement which may be entered via an interface, for example an accelerator pedal.

10 Claims, 2 Drawing Sheets

(51) Int. Cl.
*B60W 20/00* (2016.01)
*B60W 20/13* (2016.01)
*B60W 10/26* (2006.01)
*B60W 20/12* (2016.01)
*B60W 10/08* (2006.01)
*B60W 30/14* (2006.01)
*B60W 30/16* (2012.01)
*B60L 11/18* (2006.01)

(52) U.S. Cl.
CPC ............ *B60W 10/08* (2013.01); *B60W 10/26* (2013.01); *B60W 20/12* (2016.01); *B60W 30/143* (2013.01); *B60W 30/16* (2013.01); *B60W 50/0097* (2013.01); *B60L 2250/26* (2013.01); *B60W 2540/20* (2013.01); *B60W 2550/308* (2013.01); *B60W 2550/402* (2013.01); *B60W 2550/408* (2013.01); *B60W 2720/10* (2013.01); *B60W 2750/308* (2013.01); *Y02T 10/7258* (2013.01)

(58) Field of Classification Search
CPC ...... B60W 2550/308; B60W 2550/402; Y02T 10/7258
See application file for complete search history.

(56) References Cited

U.S. PATENT DOCUMENTS

| | | | |
|---|---|---|---|
| 8,373,367 B2 | 2/2013 | Yoshida et al. | 318/139 |
| 9,114,806 B2* | 8/2015 | Wang | B60W 10/06 |
| 9,266,443 B2* | 2/2016 | Payne | B60L 11/1861 |
| 2010/0287078 A1 | 11/2010 | Graehn et al. | 705/34 |
| 2011/0066308 A1* | 3/2011 | Yang | B60W 20/12 701/22 |
| 2011/0264317 A1 | 10/2011 | Druenert et al. | 701/22 |
| 2012/0323413 A1 | 12/2012 | Kedar-Dongarkar et al. | 701/22 |

FOREIGN PATENT DOCUMENTS

| | | | |
|---|---|---|---|
| DE | 112009000114 T5 | 11/2010 | B60K 6/445 |
| DE | 102010039653 A1 | 2/2012 | B60L 11/12 |
| DE | 102011085462 A1 | 5/2013 | B60W 10/06 |
| EP | 2071162 A1 | 6/2009 | B60K 6/46 |
| WO | 2015/078808 A1 | 6/2015 | B60L 15/20 |

OTHER PUBLICATIONS

International Search Report and Written Opinion, Application No. PCT/EP2014/075390, 17 pages, dated Mar. 19, 2015.

* cited by examiner

METHOD FOR CONTROLLING A HYBRID DRIVE OF A VEHICLE AND A COMPUTER PROGRAM FOR CONTROLLING A HYBRID DRIVE OF A VEHICLE

CROSS-REFERENCE TO RELATED APPLICATIONS

This application is a U.S. National Stage Application of International Application No. PCT/EP2014/075390 filed Nov. 24, 2014, which designates the United States of America, and claims priority to DE Application No. 10 2013 224 349.9 filed Nov. 28, 2013, the contents of which are hereby incorporated by reference in their entirety.

TECHNICAL FIELD

The present invention relates to a method for controlling a hybrid drive of a vehicle and to a computer program for implementing such a control method.

BACKGROUND

Hybrid drives which have an electric drive component and a drive component based on an internal combustion engine are generally known. It is also known to operate both drive components simultaneously, with the result that both drive components act on the drive. This results in a high overall drive power.

In the publication DE 10 2011 085 462 A1 it is described that an electric drive component of a hybrid drive can be activated, referred to as "boosting", wherein the type of drive is determined predicatively based on a route timetable. Depending on the route lying ahead, the electrical drive component is therefore activated at given upcoming points on the route. In this context, it is assumed that the electrical drive component and the respective energy source which feeds the electrical drive component are fully capable of use at the time which has been calculated in advance. This can be done, for example, by corresponding configuration of the response speed of the components, wherein, on the one hand, the specified prior art does not discuss the necessary response dynamics but instead assumes sufficiently fast response dynamics. However, these high response dynamics which are necessary entail configuration requirements which give rise to high component costs.

SUMMARY

One embodiment provides a method for controlling a hybrid drive of a vehicle, the method comprising: detecting a traffic and/or road situation ahead of the vehicle; determining an upcoming, expected increase in a power request of the hybrid drive based on the detected traffic and/or road situation; increasing an extraction rate which is extracted from an electrical energy source of the hybrid drive before the power request is implemented according to the determined increase; and implementing the power request of the hybrid drive after the extraction rate which is extracted from an electrical energy source of the hybrid drive has been increased.

In one embodiment, the determination of the increase in the power request comprises: determining a point in time and/or a point on a route at which the increase is expected to occur; and wherein the increase in the extraction rate comprises: the increase in the extraction rate for a minimum time period or for a minimum distance before the determined time or before the determined point on a route.

In one embodiment, the increase in the extraction rate comprises: increasing the extraction rate to a level which corresponds to an absolute value of the increase in the power request or which is larger than the absolute value of the increase in the power request.

In one embodiment, the increase in the extraction rate comprises: increasing a power of an electrical load of the vehicle, while the power of an electrical drive component of the hybrid drive is provided in accordance with the power request, or while the overall power of the drive of the vehicle is provided in accordance with the power request.

In one embodiment, the increase in the power of the electrical load comprises: increasing a power of a battery charging device, of an electric heater, of an electrical resistance which is also used to discharge excess recuperation energy, and/or of an electrically operated compressor of an air conditioning system as an electrical load of the vehicle.

In one embodiment, the implementation of the power request comprises: increasing the power of an electrical drive component of the hybrid drive in accordance with an increase in the power request if the power request is increased after the increasing of the extraction rate.

In one embodiment, the detection of the traffic and/or road situation ahead of the vehicle comprises: detecting a distance from a vehicle participant ahead by means of radar, LIDAR, ultrasound or by detecting a distance signal of an adaptive cruise controller or of a collision warning device or of another driver assistance system of the vehicle; detecting an increase in the permissible maximum speed in the route ahead by means of a navigation device or an optical image capturing device of the vehicle; detecting the breaking up of a traffic jam ahead of the vehicle by means of a traffic data service or Car-to-X receiver; detecting an upcoming intersection or entry or a start of a straight route section by means of the navigation device; and/or detecting an imminent overtaking maneuver based on an activation signal of a travel direction indicator.

In one embodiment, the method also includes transmitting the detected traffic and/or road situation and the actually following increase in the power request to a learning unit, wherein the learning unit produces relationships between the detected traffic and/or road situation and the actually following increase; wherein the determination of the upcoming, expected increase comprises: detecting a currently upcoming traffic and/or road situation and determining the currently upcoming, expected increase by applying the produced relationships to the currently upcoming traffic and/or road situation.

In one embodiment, the increase in the extraction rate comprises: increasing the extraction rate immediately or with a delay by a predetermined time period after the determination of the upcoming, expected increase, or increasing the extraction rate a predetermined time period or a predetermined distance along a route before a point in time or before a point on a route for which the increase in the power request is determined.

Another embodiment includes a computer program for controlling a hybrid drive of a vehicle which implements a method as disclosed above, having a detection subroutine which, when run on a processor, executes the step of detecting the upcoming traffic and/or road situation; a determining subroutine which, when run on a processor, processes the traffic and/or road situation detected by the detection subroutine and executes the step of determining the upcoming, expected increase in the power request; an extraction rate-increasing subroutine which, when run on a processor, processes the expected power request which is determined by the determining subroutine, and executes the step of increasing the extraction rate; and a control data-generating subroutine which, when run on a processor, processes the extraction rate increased by the extraction rate-increasing subroutine, and in order to implement the power request generates control data which represent the increased extraction rate.

BRIEF DESCRIPTION OF THE DRAWINGS

Example aspects and embodiments of the invention are described in more detail below with reference to the figures, in which.

DETAILED DESCRIPTION

Figure 1:
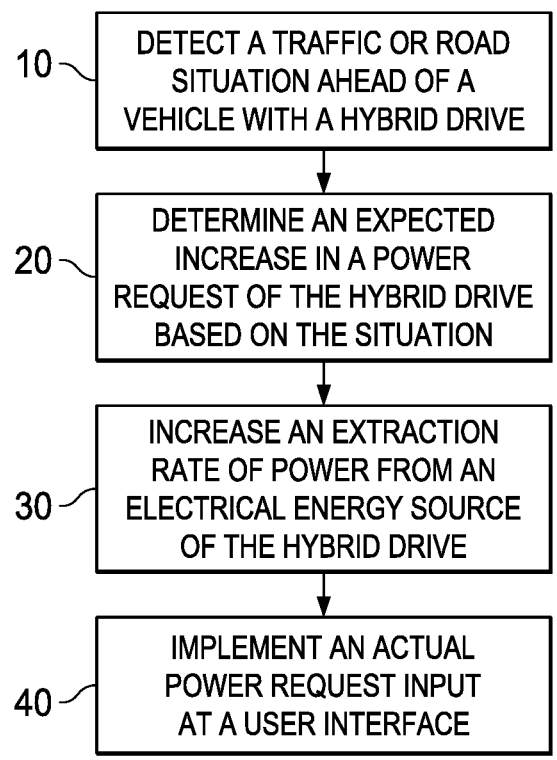
FIG. 1 shows a flow diagram explaining the method described here.

Embodiments of the invention provide an approach with which a boost function, e.g., the activation of an electric drive component of a hybrid drive can be implemented in a cost-effective way for predicatively controlled hybrid drives.

Embodiments of the invention may permit rapid activation or a rapid increase in the power of a hybrid drive by means of an electric drive component of the hybrid drive, without the electric drive component and the energy source thereof being configured in such a way that they permit a rapid increase or rapid activation solely based on their response dynamics. Instead, with the procedure described here it is possible to use any desired electric drive components of a hybrid drive and any desired associated energy sources whose response behavior cannot necessarily implement a rapid change. Furthermore, embodiments of the invention may permit the energy source with the electric drive to be protected against rapid increases in power which can cause interruptions in the on-board power system or generally in the supply power system of the electric drive.

In addition, a battery which is to be used as an energy source may be protected against rapid increases in current in the case of high current strengths, with the result that the battery is provided with a significantly longer expected service life. In particular, the last-mentioned advantage permits the use of customary lead accumulators without the latter having to be specially configured or frequently replaced, as is the case with known start-stop systems. Embodiments of the invention may permit a low-wear method of operation, while at the same time the electric drive can be activated rapidly, and therefore exacting acceleration requirements can be met. The approach described here provides that an extraction rate from an electrical energy source is not simply increased if the power of the electric drive component is to be suddenly increased but instead provides a chronological offset between the increasing of the extraction rate and the actual implementation of the increased power request. As a result, preparations can be made for the electrical energy source in order to increase its power in a constant, non-discontinuous profile. As a result, components are, as mentioned above, treated in a way which involves low wear, and can be configured with relatively low requirements in terms of dynamics. The requirements in terms of dynamics are lower with respect to the maximum rate of increase of the power than the rate of increase of the power of a rapid implementation of the power request.

After the extraction rate has been increased, the power request of the hybrid drive can be implemented rapidly without interruptions occurring in the electrical energy source, since the extraction rate thereof has already been increased and therefore the extraction rate which has already been increased is available. For example, after the increasing of the extraction rate, the power of the hybrid drive and, in particular, of the electric drive component can be rapidly increased by activating or by rapidly changing the pulse-duty factor of a pulse width modulation with which the power of the electric drive component is controlled. The chronological offset which is made possible by the approach described here provides the electrical energy source with the possibility of increasing the extraction rate in accordance with its configuration (in accordance with the relatively low requirements in terms of dynamics), if appropriate over a specific time period, with the result that it is not necessary to configure the electrical energy source in such a way that it can also rapidly increase its extraction rate. This approach can also be referred to as maintaining a dynamic reserve, wherein the maintaining process starts before the power request is actually implemented, while the dynamic reserve corresponds to the increased extraction rate. The latter can be called up immediately if necessary. For this purpose, firstly an upcoming, expected increase in a power request is determined, with the result that the extraction rate can be increased before the increased power request actually has to be implemented.

Therefore, a method for controlling a hybrid drive of a vehicle is described in which firstly a traffic and/or road situation ahead of the vehicle is detected. An upcoming, expected increase in a power request is determined based on the detected traffic and/or road situation, preferably together with a point in time or with a distance which is still to be covered until the expected increase actually occurs or is to be implemented. If appropriate, the expected increase in the power request can also be input via a user interface (for example a pushbutton key, a switch or the like), so that the driver can "preload" the drive before the increased power is actually called up.

The extraction rate which is extracted from an electrical source of the hybrid drive is subsequently increased. For example, the extraction rate is increased before the power request is implemented, according to the determined increase. The extraction rate is preferably increased before the point in time at which the increase in the power request is expected or before the distance at the end of which the increase in the power request is expected is reached. Preferably the extraction rate of an electrical energy source which supplies the electric drive component of the hybrid drive with electrical power is increased. In particular all components which are configured to generate traction power for the vehicle can be considered to be drive components. This electrical energy source can be, in particular, a traction battery, a vehicle on-board power system of the vehicle, a battery of the vehicle on-board power system, a transformer, a capacitor device (in particular a supercap arrangement), an internal combustion engine with an electric generator downstream (which generator feeds, in particular, the vehicle on-board power system and/or the traction battery or a transformer) or a combination of at least two of these components of the electrical energy source.

The increasing of the extraction rate comprises, e.g., the fact that a power which is fed to electric components of the vehicle, which do not contribute directly or indirectly, to the traction of the vehicle, is increased. These electric components form a quantity which does not have, in particular, any intersection set with the specified components of the electrical energy source.

The electric components which do not contribute to the traction (either by supplying or by converting electrical power) are also referred to as an electrical load.

Finally, the power request of the hybrid drive may be implemented, e.g., after the distance has been covered, or at the point in time at which the power request is actually increased. The power request which is implemented is preferably a power request which is input via a user interface, for example by means of an accelerator pedal, while the expected increase in a power request is linked to an estimated future power request. These do not necessarily have to be identical, but rather the upcoming, expected increase in the power request serves to prepare the electrical energy source by increasing its extraction rate. The power request which is implemented corresponds with respect to the level and point in time of the power request which is input by the driver of the vehicle by means of the user interface. When the power request is implemented, the power which reduces the electrical load (which does not contribute to traction) in favor of the power which is fed to the hybrid drive and, in particular, to the electric drive component of the hybrid drive. This process can be compared with switching over the increased power flux (in accordance with the increased extraction rate) from the electrical load as a sink to the electrical drive component of the hybrid drive as a sink. The switching over is not necessarily a change from 0% to 100% here but instead it can correspond, in particular, to an increase from a positive value to a larger positive value of the power. For a more precise explanation of the individual power profiles, reference is made to the figures.

The step of determining the increase in the power request can comprise determining a point in time and/or a point on a route at which the increase is expected to occur. Instead of the point on the route it is also possible to determine a distance to be traveled at the end of which the increase is expected to occur. In this context, the point on the route corresponds to the end of this route, wherein the definitions which are presented here and which relate to the point on the route apply analogously for the distance which is still to be covered, and vice versa. The extraction rate is preferably increased for a minimum time period or for a minimum distance before the determined point in time or before the determined point on a route. In particular, the extraction rate is increased before or during the coverage of the distance which is still to be covered up to the expected increase in the power request. This minimum time period or minimum distance can be predefined as a constant or can be variable. The minimum time period or minimum distance is dependent, for example, on the magnitude of the increase or dependent on at least one operating parameter of the battery of the electrical energy source or of other components of the electrical energy source. The at least one operating parameter influences the response dynamics of the electrical energy source or at least of a component of the energy source. The operating parameter can be a temperature or a state of aging of the electrical energy source or of a component thereof, for example of the battery (for example on-board power system battery, traction battery or the capacitor device). For example at low temperatures the battery has a lower response rate than at temperatures which are relatively high compared thereto, with the result that the minimum time period or the minimum distance is shorter or smaller at a lower temperature than at a temperature which is higher in comparison therewith.

The minimum time period or the minimum distance can also be dependent on a value which represents the expected increased power request. In the text which follows, three dependencies are specified which can be applied individually or in any desired combination (for example by weighted combination). The lower the response dynamics of the electrical energy source or of a component of the energy source (preferably the component with the slowest response dynamics), the larger the value which can be selected for the minimum time period or the minimum distance. The larger the expected (increased) power request, the larger the value which can be provided for the minimum time period or the minimum distance. The larger the increase, the larger the value which can be selected for the minimum time period or minimum distance. These relationships can be represented individually or in combination in the form of a function or in the form of a characteristic diagram. This function or this characteristic diagram can be used to determine the minimum time period or the minimum distance from the response dynamics, from the expected power request or from the expected increase. The minimum time period or the minimum distance specifies how far the start of the increase in the extraction rate occurs before the point in time or the point on the route of the actual increase in the power request.

In addition it can be predefined that the extraction rate is increased to a level which corresponds to an absolute value of the power request (i.e. the expected, increased power request). Alternatively, the increase in the extraction rate can also be larger than the absolute value of the expected increased power request. The increased power request corresponds to the power request after the latter has been increased in accordance with the expected increase.

The increase in the extraction rate can be provided by increasing a power of an electrical load of the vehicle, in particular of an electric component, which does not contribute to the traction as described herein. During the increasing process, the power of an electrical drive component of the hybrid drive is provided in accordance with the power request, in particular in accordance with the actual power request which is received by a user interface. The power of the electrical load is preferably increased essentially by the same absolute value as the extraction rate of the electrical energy source is increased. The power of the electrical load is essentially increased by the same absolute value and at the same point in time as the extraction rate is increased. As a result the power of the electric drive component can be provided such as is provided, for example, by a controller or by the user interface. The increasing of the extraction rate and the increasing of the power of the electrical load therefore have essentially no influence on the power of the electric drive component during the increasing process.

The power request can be provided by a user interface which is connected to the electric drive component via a controller, wherein this controller preferably controls both the power of the electric drive component and that of a drive component of the hybrid drive which is based on an internal combustion engine. In particular, the overall power of the hybrid drive (i.e. the overall traction power of the drive of the vehicle) remains the same (up to the implementation of the increase, i.e. up to the inputting of an increased power request at a user interface), or is provided in accordance with the power request which is input at the user interface. Therefore, the method which is described here and which serves to generate a dynamic reserve has no influence on the ratio of the input power request and the implemented power of the hybrid drive.

It is possible to provide as a specific configuration possibility that the power of the electrical load (or alternatively the power of a plurality of electrical loads) is increased by increasing a power of a battery charging device, of an electric heater, of an electrical resistance which is also used to discharge excess recuperation energy, and/or of an electrically operated compressor of an air-conditioning system. These electrical loads are to be considered as the electrical loads of the vehicle which are described here and whose power is increased while the extraction rate is increased. As already mentioned, the extraction rate and the power of the electrical load/loads are increased synchronously and preferably also with the same chronological profile. As has also already been mentioned, the increasing of the power of the electrical load compensates the increasing of the extraction rate essentially completely or at least partially. The electric load components (battery charging device, electric heater, electrical resistance or electrically operated compressor) mentioned above are electric examples of electric components which do not contribute to the traction of the vehicle. These loads are components which take up electrical energy and convert it into another form of energy, preferably into heat, into pressure or into kinetic power, in so far as this kinetic power is not used for traction, for example for generating an airflow or a flow of heating fluid.

Furthermore, there can be provision that the power request is implemented by increasing the power of the electrical drive component of the hybrid drive in accordance with the increase in the power request which is input, in particular, at the user interface (for example accelerator pedal) or also in accordance with determined power requests if the power request (detected at the user interface) is increased after the increasing of the extraction rate. In other words, the power of the electric drive component is actually increased only if this is determined at the user interface. If the determined power request does not occur, i.e. since an expected increase is determined, but no increased power request is input at the user interface at the respective point in time or point on the route, the hybrid drive is operated in accordance with the power request as input via the user interface. Such incorrect determinations can be fed to a learning process, as described further below, for example. In the text which follows, a number of possible ways of detecting the traffic and/or road situation ahead of the vehicle are specified. These possible ways can be combined with one another, for example by means of a weighted combination such as a weighted addition of individual values which correspond to individual data items or signals specified below.

The traffic and/or road situation can be detected by detecting a section leading to a vehicle participant ahead. The section can be detected by means of radar, LIDAR, by means of ultrasound or also by capturing images by means of a camera system, in particular by means of a stereo camera system. In addition, the distance can be detected by detecting a distance signal of an adaptive cruise controller, a collision warning device and/or another driver assistance system of the vehicle. As a result, the distance can be detected by additionally using a distance signal for detecting the distance according to the method in addition to the actual function within the adaptive cruise controller, the collision warning device or other driver assistance systems. Instead of, or in combination with, the distance it is also possible to detect a relative speed with respect to a vehicle participant ahead by means of these approaches. The more the distance increases or the higher the relative speed, the larger the upcoming expected increase in the power request.

In addition, an increase in a permissible maximum speed in the route ahead can be detected. This increase can be detected by means of a navigation device in which, in addition to map data, speed limits are also stored in relation to route sections. Alternatively or in combination therewith, a permissible maximum speed can be detected by means of an optical image capturing device which comprises, in particular, a camera and an image processing device which is connected downstream. The larger the difference between a current speed of the vehicle and the detected increased permissible maximum speed, the larger the upcoming, expected increase. The optical image capturing device here can detect road signs which specify the maximum speed directly, or can detect other road signs which are associated with a permissible maximum speed. The permissible maximum speed is, in particular, the maximum speed which is permissible in respect of traffic regulations.

In addition, the breaking up of a traffic jam lying ahead of the vehicle can be detected. This corresponds to the detection of an increase in the average speed of the traffic in an upcoming route section. This can be detected by means of a traffic data service or receiver of a multi-vehicle communication network, e.g., Car-to-X receiver (e.g., a Car-to-Car receiver or a Car-to-Infrastructure receiver). In particular in the case of the reception of updated traffic data, which indicates a shortening or breaking up of an upcoming jam (or section with increased traffic density), according to the method an expected increase in a power request can be determined. The larger the difference between a current speed of the vehicle and an expected, relatively high speed owing to of the breaking up of the traffic jam, the larger the expected increase in the power request.

Generally, the increase in the power request can be considered to be an increase in the setpoint speed of the vehicle, wherein the expected increase in the power request can also be interpreted as being an expected acceleration process. In addition, an upcoming intersection or an entry or a start of a straight route section can be detected. This can be detected, in particular, by means of a navigation device. Since the speed, and therefore also the power request, is usually increased after an intersection or entry is passed or at the start of a straight route section, an expected increase in the power request can be determined based on this data. Depending on the route feature (intersection, entry or start of a straight route section) values can be provided which represent an expected increase in the power request. In addition, values can be specified which represent an absolute value of an increase in speed when an intersection or an entry is passed or at the start of a straight route section. In addition it is possible to provide that the expected increase in the power request is larger, the smaller a bend radius before the start of the straight route section.

Finally, an imminent overtaking maneuver can be detected. The overtaking maneuver can be detected based on an activation signal of a travel direction indicator or by detecting a lane change by means of a driver assistance system which is configured to detect lane changes. The larger the difference between a current speed of the vehicle at the start of, or before, the overtaking maneuver and the permissible maximum speed on the current route section, the larger the expected increase in the power request. As already mentioned, the possible ways of detecting the upcoming traffic and/or road situation as mentioned above can also be combined.

In some embodiments, the detected traffic and/or road situation and the actually following increase in the power request are transmitted to a learning unit. The actually following increase in the power request is detected based on the driving signals which are input at the user interface (for example accelerator pedal). In addition, the actually following increase in the power request can be detected by detecting a control signal which actuates a drive component of the hybrid drive or the entire hybrid drive. The learning unit produces relationships between the detected traffic and/or road situations and the actually following increase. The relationships can be represented, for example, in the form of a database in which values of two rows of data are contrasted, wherein the two rows of data correspond to the detected traffic and/or road situation and the actually following increase. In addition, the relationships can be produced by increasing or reducing weightings which project detected traffic and/or road situations onto following increases, for example within the scope of a neural network. As a result, the learning unit can learn from preceding situations or power requests. In this context, the production of the relationships corresponds to the learning process. The learnt relationships are preferably transmitted to current traffic and/or road situations in order to determine a current expected increase therefrom. A currently upcoming traffic and/or road situation is therefore detected, wherein the current expected increase is determined by applying the produced relationships (i.e. by taking into account already preceding situations or increases) to the currently upcoming traffic and/or road situation.

The extraction rate is preferably increased by increasing the extraction rate immediately after the determination of the upcoming, expected increase. Alternatively, the extraction rate can be increased with a delay by a predetermined time period after the determination of the upcoming, expected increase. In particular, if the extraction rate is not increased until after a delay, the upcoming traffic and/or road situation can be detected once more and the expected increase can be determined once more, in order to put it aside in the event of a different result (compared to the first detection or determination of an increase in the extraction rate). As a result, fault-generating detection results which occur only temporarily are suppressed.

Alternatively, the extraction rate can be increased before a point in time or before a point on a route for which the increase in the power request is determined. In particular, the extraction rate can be increased a predetermined time period or a predetermined distance along a route before this point in time or before this point on the route for which the increase is determined. In this case, the predetermined time period or the predetermined distance along the route can be adapted to the response dynamics of the electrical energy source. In this context, a time period which is sufficient for the electrical energy source to increase the extraction rate is shorter than or equal to the predetermined time period. Within the time period or within this distance along the route it is possible for the extraction rate to be increased in accordance with the configuration of the electrical energy source and, in particular, in accordance with a permissible rate of increase of the power of the electrical energy source. The predetermined time period or the predetermined distance along the route therefore corresponds to a targeted profile during which the extraction rate is increased predicatively in order to prepare for the increase in the power request. This increase in the extraction rate before the actual occurrence of the power request corresponds to the configuration of a dynamic reserve which is provided by increasing the extraction rate. Furthermore, a computer program for controlling a hybrid drive of a vehicle is described which, when run on a processor, implements the steps of the method described here.

A computer program for controlling a hybrid drive of a vehicle may implement any of the methods disclosed, the computer program having a detection subroutine which, when run on a processor, executes the step of detecting the upcoming traffic and/or road situation; a determining subroutine which, when run on a processor, processes the traffic and/or road situation detected by the detection subroutine and executes the step of determining the upcoming, expected increase in the power request; an extraction rate-increasing subroutine which, when run on a processor, processes the expected power request which is determined by the determining subroutine, and executes the step of increasing the extraction rate; and a control data-generating subroutine which, when run on a processor, processes the extraction rate increased by the extraction rate-increasing subroutine, and generates control data which represent the increased extraction rate.

A microprocessor may be used as the processor on which the computer program runs, wherein the computer program is stored in a memory which is functionally connected to the microprocessor. The microprocessor can be, and in particular the memory with the computer program is, preferably provided in an engine control device. In this context, the microprocessor can also execute other functions of the engine control device.

It is to be noted that the expected increase is an estimated value which is linked to a future point in time. In order to differentiate actually occurring upcoming increases from these estimated values, the term "upcoming, expected increase" is used.

FIG. 1 shows a symbolic flowchart which indicates steps and the sequence thereof as they occur in the method described here, according to example embodiments.

Firstly, in step 10 a traffic and/or road situation ahead of the vehicle is detected, in particular automatically. The detection takes place, for example, by means of distance sensors or else by means of other vehicle-side units with which information about the traffic ahead or the road situation ahead can be collected.

In the following step 20, an upcoming, expected increase in a power request of the hybrid drive is determined based on the data detected in step 10. This determination is, in particular, an estimate, wherein the expected increase is, as already mentioned, as estimated value.

In step 30, an extraction rate which is extracted from an electrical energy source of the hybrid drive is increased. In this context, for example a battery which is only used to feed an electrical traction motor of the hybrid drive serves as the electrical energy source. In addition, an on-board power system and, in particular, an on-board power system battery may serve as the electrical energy source of the hybrid drive.

The extraction rate can be extracted by means of a DC/DC transformer. The step 30 of increasing the extraction rate is executed before the power request is implemented in the following step 40. Between the step 30 and the step 40 there is a targeted delay or a minimum time period which is used to prepare the energy source for the imminent increase in the power request. In the time interval between the step 30 and the step 40 the extraction rate can preferably be increased in a constant fashion or can be increased in accordance with a negative-exponential function, wherein a deviation of this increase from a rapid change does not have any influence on the implementation of the increased power request, since the power request is not implemented until after the expiry of this time interval in step 40. Instead, electrical loads with which a deviation from a rapid change in a power increase is not disadvantageous (in contrast to the hybrid drive) are operated in this time interval.

In particular, this delay or the time interval relates to the time between the start of the step 30 and the start of the step 40, with the result that the delay or the time interval can also already start during the step 30. While the step 30 of increasing the extraction rate is being carried out, a power of an electrical load is increased essentially in the same way as the extraction rate is increased, i.e. in particular not rapidly either.

The increase in the power of the electrical load can be adapted to the profile of the increase in the extraction rate, which profile can in turn depend on the response behavior of the electrical energy source. During the increasing of the extraction rate it is possible to take into account prescriptions, for example prescriptions such as a maximum rate of increase of the power (which can correspond to the response dynamics) which ensures that, for example, a voltage of the on-board power system or of a traction battery does not experience any (significant) interruption. In addition, a maximum rate of increase for the power can be predefined which is not exceeded during the increasing of the extraction rate and which marks a limit above which the battery will be damaged in the long term. As already mentioned, the profile of the extraction rate can depend on operating parameters of the electrical energy source, for example on a temperature of the battery or of a DC/DC transformer.

In step 40, the power request of the hybrid drive is implemented. In this context, the power request which is actually input at a user interface is implemented. The step 40 is executed after the extraction rate has been increased in step 30.

Figure 2:
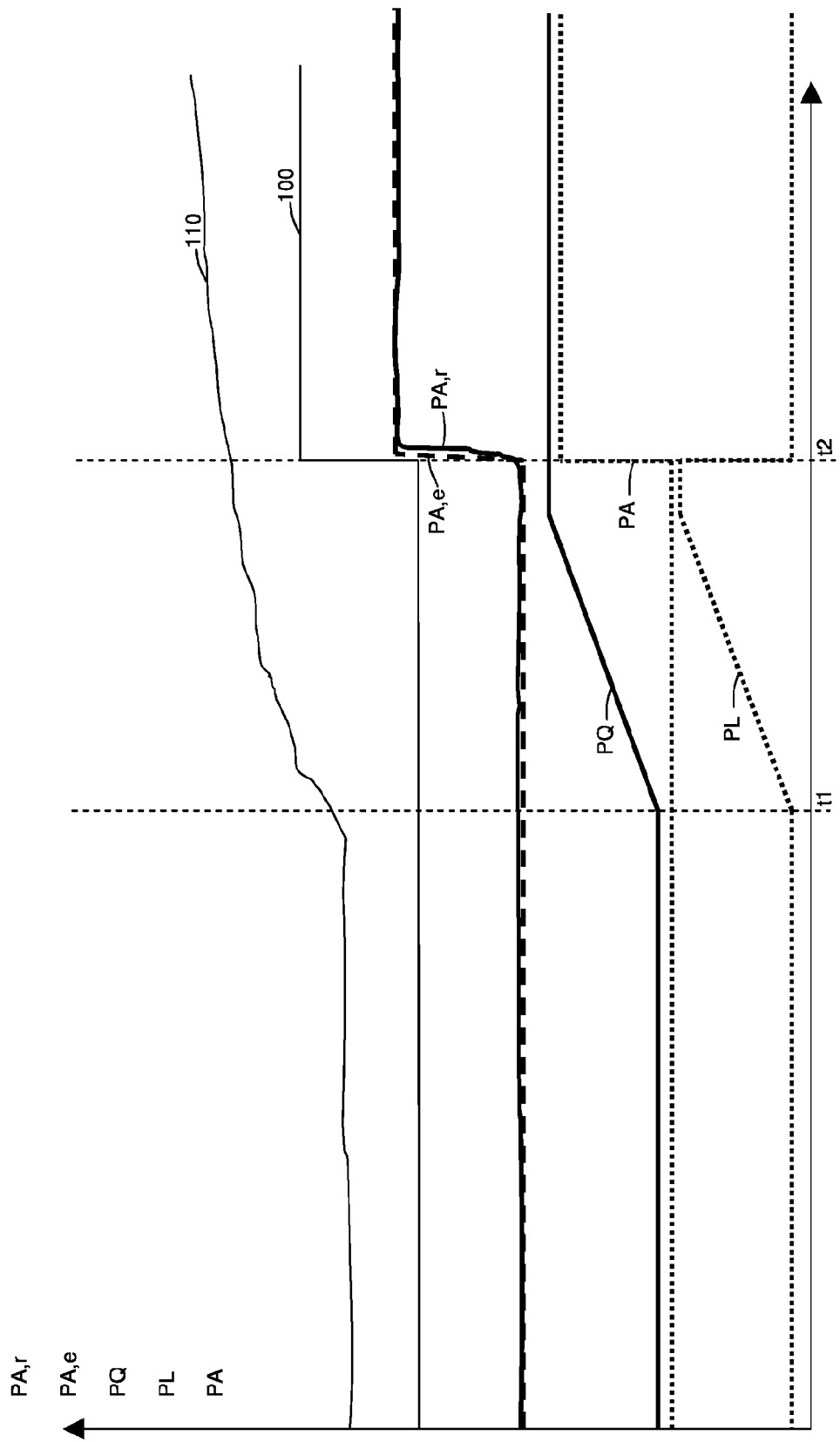
FIG. 2 shows a timing sequence diagram in order to explain in more detail the procedure described here.

FIG. 2 shows a profile diagram of various powers which are used within this method, as well as values which represent a traffic and road situation. The values which represent the traffic or road situation are illustrated with a thinner line in the timing profile than the profiles of the powers. The line 100 represents the legally permissible maximum speed for the roads which the vehicle is instantaneously traveling on. In this context, at the point in time t1 it is detected that a route with a relatively high maximum speed lies ahead, wherein the relatively high maximum speed applies starting from the point in time t2. At the point in time t1, it is possible, for example, for a forward looking camera to detect a road sign which indicates the permissible maximum speed, while t2 marks the point in time at which the road sign is passed. The line 110 shows, as a further possible way of detecting a traffic or road situation, the speed of the vehicle ahead, which can be transmitted, for example, to the vehicle (whose hybrid drive is controlled according to the method) via car to car communication. Alternatively it is possible to consider the line 110 as a distance from the vehicle ahead, wherein at the point in time t1 the distance begins to increase, with the result that at the point in time t2 it is to be expected that the vehicle will follow the acceleration of the vehicle ahead and will increase its speed (and therefore the power request to the hybrid drive). In addition it is conceivable that at the point in time t2 a message is received according to which at the point in time t2 an upcoming traffic jam breaks up, with the result that at the point in time t2 it is to be expected that the power request is increased. In addition, the point in time t1 can correspond to the point in time at which an upcoming end of road works is located, while at the point in time t2 the end of the road works is passed.

The line Pa,r represents the time profile of the actual power request which is indicated at a user interface. It is apparent that at the point in time t2 said power request increases rapidly, since at this point in time a higher maximum speed applies or the traffic ahead becomes more sparse, corresponding to the breaking up of a traffic jam. The curve PA represents the power with which the hybrid drive and, in particular, the electric drive component thereof is operated thereby. It is apparent that at the point in time t2 at which an actual power request detected by means of the user interface occurs, the power of the hybrid drive or of the drive component is increased rapidly.

The curve PL shows the time profile of the power which is transmitted to the electrical load or electrical loads. It is apparent that starting from the point in time t1 starting from which the extraction rate is increased in accordance with the step 30, the power of the electrical load also rises.

In parallel with this, the curve PQ shows the profile of the extraction rate which is extracted from an electrical energy source. Since said extraction rate divides into the power of the electrical load PL and the power of the electric drive PA, the curve PQ corresponds essentially to the sum of the curves PL and PA.

It is apparent that before the point in time t2 the curve PQ is increased with a rate of increase which is significantly lower than the rate of increase of the curve PA at the point in time t2. As a result of the relatively low rate of increase of the extraction rate PQ, the electrical energy source can be prepared over a certain time period (i.e. in the time period between t1 and t2) for the expected increase in the power request Pa, e by slowly increasing the power. In order to keep the drive power PA constant for the time period between t1 and t2, i.e. in particular for the time period before t2 or to keep it at the level which corresponds to the actual power request, the power of the electrical load PL increases in the same way as the extraction rate. In the same way means here by the same absolute value, with the same rate of increase and/or over the same time period.

At the point in time t2, the power of the hybrid drive is increased rapidly, in accordance with the actual increase, and in accordance with the expected increase, in the power request Pa, r and Pa, e. In order to compensate this, the electrical load is reduced rapidly in the same way as the drive power is increased, i.e. in accordance with the increase in the power request. The reduction of the power of the electrical load therefore compensates the increase in the power request which is apparent from the curve PA.

The step 10 of detecting the traffic or road situation can be assigned, in particular, to the time period t1, and the step 20 of determining the upcoming, expected increase can be assigned to the point in time t1 or to a time period before t1, and the step 30 of increasing the extraction rate can be assigned to the time period between t1 and t2, even if in FIG. 2 the increase in the extraction rate does not extend over the complete interval width between t1 and t2, and the step of implementing the power request can be assigned to the step t2 or to the following time.

The profiles illustrated in FIG. 2 are not illustrated to scale. Only the distance between PQ and PL is essentially constant at least in the time period from t1 to t2. In addition, the reduction in the power of the load PL at the point in time t2 is as large in terms of absolute value as the increase in the drive power PA at the point in time t2. In addition it is to be noted that at the point in time t2 the rise in the curve PA corresponds unconditionally to the rise in the curve Pa, e.

LIST OF REFERENCE SYMBOLS

10 Step of detecting an upcoming traffic and/or road situation;
20 Step of determining an upcoming, expected increase in a power request;
30 Step of increasing an extraction rate which is extracted from an electrical energy source;
40 Step of implementing the power request of the hybrid drive as input at an input interface;
100 Profile of the permissible maximum speed on the route;
110 Speed of the vehicle ahead or else distance from the vehicle ahead;
PA,r: Actual power request, input by means of a user interface (for example by means of an accelerator pedal);
Pa,e: Determined power request, or predicatively estimated power request;
PQ: Extraction rate which is extracted from an electrical energy source;
PA: Power of the hybrid drive, in particular of the electric drive component of the hybrid drive;
PL: Power which is output to an electrical load or to a plurality of electrical loads which do not contribute to the traction of the vehicle

What is claimed is:

1. A method for controlling a hybrid drive of a vehicle, the method comprising:
   detecting a driving situation ahead of the vehicle, the driving situation including at least one of a traffic situation and a road situation;
   determining an upcoming expected increase in a power request of the hybrid drive based on the detected driving situation;
   increasing an energy extraction rate that is extracted from an electrical energy source of the hybrid drive before the power request is implemented according to the determined increase; and
   implementing the power request of the hybrid drive after the energy extraction rate has been increased.

2. The method of claim 1, wherein:
   determining the increase in the power request comprises determining at least one of a point in time or a point on a route at which the increase is expected to occur; and
   increasing the energy extraction rate comprises the increase in the energy extraction rate for a minimum time period or for a minimum distance before the determined time or before the determined point on a route.

3. The method of claim 1, wherein increasing the energy extraction rate comprises increasing the energy extraction rate to a level that matches or exceeds an absolute value of the increase in the power request.

4. The method of claim 1, wherein increasing the energy extraction rate comprises increasing a power of an electrical load of the vehicle while:
   the power of an electrical drive component of the hybrid drive is provided in accordance with the power request, or
   the overall power of the drive of the vehicle is provided in accordance with the power request.

5. The method of claim 4, wherein increasing the power of the electrical load comprises increasing a power of at least one of a battery charging device, an electric heater, an electrical resistance that is also used to discharge excess recuperation energy, or an electrically operated compressor of an air conditioning system.

6. The method of claim 1, wherein implementing the power request comprises increasing the power of an electrical drive component of the hybrid drive in accordance with an increase in the power request if the power request is increased after the increasing of the energy extraction rate.

7. The method of claim 1, wherein detecting the driving situation ahead of the vehicle comprises at least one of:
   detecting a distance from a vehicle participant using radar, LIDAR, ultrasound, or based on a distance signal of an adaptive cruise controller or of a collision warning device or another driver assistance system of the vehicle;
   detecting an increase in a maximum permissible speed in a route ahead of the vehicle using a navigation device or an optical image capturing device of the vehicle;
   detecting an end of a traffic jam ahead of the vehicle using a traffic data service or receiver of a multi-vehicle communication network;
   detecting an upcoming intersection or beginning of a straight route section using a navigation device; and
   detecting an imminent overtaking maneuver based on an activation signal of a travel direction indicator.

8. The method of claim 1, further comprising:
   transmitting the detected driving situation and an actual following increase in power request to a learning unit,
   generating relationships, by the learning unit, between the detected driving situation and the actual following increase in power request;
   wherein determining the upcoming expected increase in the power request comprises:
   detecting a current upcoming driving situation, and
   determining the upcoming expected increase in power request by applying the generated relationships to the current upcoming driving situation.

9. The method of claim 1, wherein increasing the energy extraction rate comprises:
   increasing the energy extraction rate immediately or after a predetermined time delay after the determination of the upcoming, expected increase, or
   increasing the energy extraction rate a predetermined time period or a predetermined distance along a route before a point in time or before a point on a route for which the increase in the power request is determined.

10. A computer program product for controlling a hybrid drive, the computer program product comprising computer instructions stored in non-transitory computer-readable media and executable by a processor to:
    detect an upcoming driving situation, the upcoming driving situation including at least one of an upcoming traffic situation and an upcoming road situation;
    based on the detected upcoming driving situation, determine an upcoming expected increase in a power request of the hybrid drive;
    increase an energy extraction rate based on the determined upcoming expected increase in power request of the hybrid drive; and
    implement the power request of the hybrid drive after the energy extraction rate has been increased.

* * * * *